(12) United States Patent
Rigamonti et al.

(10) Patent No.: US 11,847,354 B2
(45) Date of Patent: Dec. 19, 2023

(54) DATA STORAGE USING A SLIDING WINDOW CACHE IN A DATA GRID

(71) Applicant: Red Hat, Inc., Raleigh, NC (US)

(72) Inventors: Vittorio Rigamonti, Pregnana Milanese (IT); Tristan Tarrant, Cernobbio (IT)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 17/697,121

(22) Filed: Mar. 17, 2022

(65) Prior Publication Data
US 2023/0297278 A1    Sep. 21, 2023

(51) Int. Cl.
*G06F 12/00* (2006.01)
*G06F 3/06* (2006.01)

(52) U.S. Cl.
CPC ............ *G06F 3/0659* (2013.01); *G06F 3/067* (2013.01); *G06F 3/0619* (2013.01); *G06F 3/0652* (2013.01)

(58) Field of Classification Search
None
See application file for complete search history.

(56) References Cited

U.S. PATENT DOCUMENTS

| | | | |
|---|---|---|---|
| 7,627,432 B2 | 12/2009 | Wilkinson | |
| 9,122,786 B2 * | 9/2015 | Cammert | .......... G06F 16/24568 |
| 9,430,444 B2 | 8/2016 | Lu | |
| 10,248,690 B1 | 4/2019 | Lu | |
| 10,394,809 B1 | 8/2019 | Lu | |
| 10,644,982 B2 | 5/2020 | Haye et al. | |
| 11,556,536 B2 * | 1/2023 | Bhogal | ............. G06F 16/24539 |

OTHER PUBLICATIONS

"Introduction to Stream Analytics Windowing Functions," Microsoft Docs, Dec. 7, 2021, https://docs.microsoft.com/en-us/azure/stream-analytics/stream-analytics-window-functions.
Rivetti, N., et al., "Efficiently Summarizing Data Streams over Sliding Windows," IEEE 14th International Symposium on Network Computing and Applications, Sep. 2015, pp. 151-158, https://hal.archives-ouvertes.fr/hal-01535693/document.

* cited by examiner

*Primary Examiner* — Daniel D Tsui
(74) *Attorney, Agent, or Firm* — Kilpatrick Townsend & Stockton LLP

(57) ABSTRACT

A sliding window cache can be used for data storage in a data grid. For example, a computing device can receive a request from a client device for storing a data entry in a data grid. The computing device can store the data entry in a first data set including a plurality of data entries distributed across a plurality of nodes of the data grid. The computing device can also store the data entry in a second data set in a sliding window cache that is embedded in the data grid. The second data set can include a subset of the plurality of data entries synchronized with the plurality of data entries of the first data set. The computing device can determine a statistic measurement associated with the sliding window cache and output the statistic measurement to the client device.

20 Claims, 3 Drawing Sheets

DATA STORAGE USING A SLIDING WINDOW CACHE IN A DATA GRID

TECHNICAL FIELD

The present disclosure relates generally to distributed computing systems. More specifically, but not by way of limitation, this disclosure relates to data storage using a sliding window cache in a data grid.

BACKGROUND

Distributed computing environments (e.g., cloud computing systems, data grids, and computing clusters) have recently grown in popularity given their ability to improve flexibility, responsiveness, and speed over conventional computing systems. The way in which software programs are deployed inside distributed computing environments has also evolved in recent years. A data grid is an architecture or set of services that allow users to modify and transfer large amounts of geographically distributed data. An in-memory data grid may store data into Random Access Memory (RAM). Multiple copies of data can be stored in the data on different nodes to offer resilience in case of node failure.

DETAILED DESCRIPTION

Figure 1:
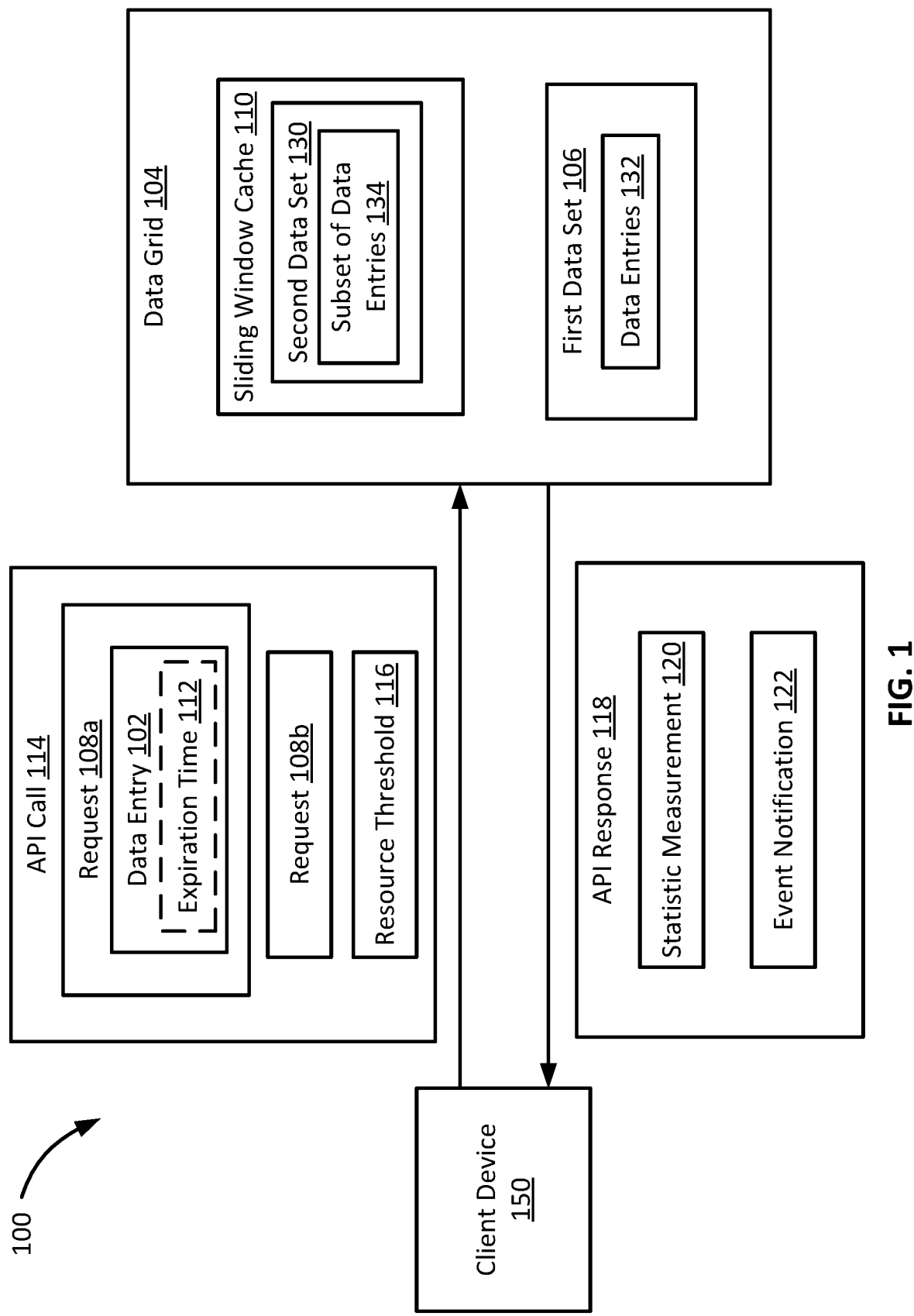
FIG. 1 is a block diagram of an example of a system for implementing data storage using a sliding window cache in a data grid according to some aspects of the present disclosure.

In distributed computing environments, data can be from different client devices simultaneously, which can result in inconsistent data and overloaded servers of a computing system. A server may become overloaded when receiving high volumes of data. Inconsistent data can result from client devices transmitting conflicting data values for a particular measurement. In distributed computing environments other than data grids, there may be users, a server, and a database. The users may run a software application on the server. The software application may involve data from the database. As a number of users grows, data consistency may suffer as the server is not capable of correcting for the inconsistency. To improve data consistency, the server may be expanded, or one or more additional servers may be added to the distributed computing environment. But, adding or expanding servers may result in a bottleneck at the database. So, rather than expanding or adding servers, additional databases may be added to the distributed computing environment to improve data consistency. But, expanding to an additional database can be undesirable since maintenance of the database may be expensive and keeping multiple databases in agreement can be complicated and problematic.

Some examples of the present disclosure can overcome one or more of the abovementioned problems by providing a system that a data grid with an embedded sliding window cache. The sliding window cache can be a memory device included in a server of the data grid. The sliding window cache can be a cache device that implements a sliding window algorithm as a sampling technique for data stored in the cache device. Data stored in the sliding window cache may be kept in sync with data in another storage device, such as a database. In some examples, the sliding window cache may be dedicated to a particular user and the memory device of the server may include multiple caches for multiple users. So, the system may allow for communication and synchronization of data providing enhanced data consistency.

In some examples, the system can receive a request for storing a data entry in the data grid from a client device. The system can store the data entry in a first data set that includes multiple data entries. For example, the first data set may be stored in portions of memory devices of multiple nodes of the data grid. The first data set can include an entirety of data entries received by the data grid from multiple client devices. The system can also store the data entry in a second data set of the sliding window cache embedded in the data grid. The sliding window cache can be other portions of the memory devices that store a subset of the data entries stored in the first data set. At some point in time, the system may receive a request for a statistic measurement associated with the second data set of the sliding window cache, and the system can determine the statistic measurement. The system can then output the statistic measurement to a client device that requested the statistic measurement.

In a particular example, the data grid may receive data entries from multiple users about daily temperatures in their corresponding geographic locations. Upon receiving a data entry of a temperature value from a particular user, the data grid can store the temperature value in a first data set that stores all of the temperature values received from the users and a second data set that stores a subset of the temperature values. The subset may be a subset of temperature values received from the particular user, or a subset of temperature values received from some or all of the users. The second data set can be stored in a sliding window cache of the data grid. Temperature values in the second data set may be removed from the sliding window cache based on an expiration time of the data entries or a fixed size of the sliding window cache. At some point in time, a user can request an average temperature value, and the data grid can output the average temperature value to the user based on the data entries in the second data set. Use of the data grid with an embedded sliding window cache may alleviate data inconsistency arising from conflicting data and data entries submitted from the multiple users at a high rate. So, the statistic measurements provided to the users may be more accurate.

FIG. 1 is a block diagram of an example of a system 100 for implementing data storage using a sliding window cache 110 in a data grid 104 according to some aspects of the present disclosure. The system 100 can include the data grid 104 and a client device 150, which can communicate over a network such as the Internet or a local area network (LAN). In some examples, the data grid 104 may be distributed across a plurality of nodes. For example, the data grid 104 may be an in-memory data grid that is stored in memory devices across the plurality of nodes. The data grid 104 can include a first data set 106 and a second data set 130. The first data set 106 and the second data set 130 may be stored across the memory devices of the various nodes of the data grid 104, but the second data set 130 can be stored in a sliding window cache 110 that is separate from locations where the first data set 106 is stored. The sliding window cache 110 can be a cache storage layer that uses a sliding window algorithm as a sampling technique for storing data entries.

The data grid 104 may manage data inconsistency with a locator. The locator may track metadata related to the data entry 102 or other data entries. The locator may send a confirmation to the client device 150 that the data entry 102 has been stored after the data entry 102 has been copied to a memory and an auxiliary memory. Copying the data entry 102 to an auxiliary memory may satisfy a condition of the data grid 104 for data entries be copied to at least two physically independent data storage mechanisms.

The locator may protect consistency of data entries in the event a node or other computing device within the data grid 104 loses communication with the data grid 104. The locator may maintain a ledger of data entries stored within the data grid 104. The locator may refer to the ledger of data entries to ensure that data entries are copied to at least two physically independent data storage mechanisms. In one example, the data entry 102 is stored the memory and the auxiliary memory. In this example, if the auxiliary computing device loses communication with the data grid 104, the ledger may prompt the data grid 104 to copy the data entry 202 to a tertiary memory on a tertiary computing device.

In some examples, the data grid 104 can receive a data entry 102 from a client device 150. The data grid 104 can receive a request 108a for storing the data entry 102 from the client device 150 via an application programming interface (API) call 114. Upon receiving the request 108a, the data grid 104 can store the data entry 102 in the first data set 106. The first data set 106 can include data entries 134, which can be an entirety of data entries received by the data grid 104 from the client device 150 and other client devices.

The data grid 104 can also store the data entry 102 in the second data set 130 of the sliding window cache. The second data set 130 can include a subset of data entries 134, which is a portion of the data entries 132 stored in the first data set 106. The data grid 104 can synchronize the subset of data entries 134 with the data entries 132. In some examples, the data grid 104 may store the data entry 102 in the first data set 106 and the second data set 130 simultaneously. Alternatively, the data grid 104 may initially store the data entry 102 in the first data set 106 and then perform an update to copy the data entry 102 from the first data set 106 to the second data set 130.

The sliding window cache 110 may be a fixed size, and thus have a limited capacity for data entries in the second data set 130. Upon receiving the request 108a, the data grid 104 may determine that storing the data entry 102 may result in the second data set 130 exceeding the fixed size. So, prior to storing the data entry 102, the data grid 104 may remove an oldest data entry within the sliding window cache 110. Removing the oldest data entry can correspond to a first-in-first-out (FIFO) eviction policy for the sliding window cache 110, but other eviction policies are also possible.

In some examples, rather than the sliding window cache 110 being a fixed size and removing data entries based on when the data entries were received by the sliding window cache 110, the sliding window cache 110 may remove data entries based on an expiration time 112. Each data entry received by the data grid 104 may have an associated expiration time 112, which can be a time length for the data entry to remain in the sliding window cache 110 before being removed. For example, the data entry 102 may be associated with an expiration time 112 of ten minutes. Upon storing the data entry 102 in the second data set 130 and determining the expiration time 112 passing subsequent to the data entry 102 being stored in the sliding window cache 110, the data grid 104 can remove the data entry 102 from the sliding window cache 110. Each data entry of the subset of data entries 134 stored in the sliding window cache 110 may have a same expiration time, or the expiration times for the subset of data entries 134 may vary.

The sliding window cache 110 can serve as a source for statistical analysis over a distributed flow of recent data entries, since the subset of data entries 134 within the sliding window cache 110 may be continually updated by additions, expirations, and evictions. The data grid 104 may determine statistic measurements from the subset of data entries 134 stored in the sliding window cache 110. For example, the data grid 104 may receive a request 108b from the client device 150 for a statistic measurement 120 via the API call 114. The API call for the request 108a may be a same or a different API call for the request 108b. Examples of the statistic measurement 120 can include an average measurement, a standard deviation measurement, a variance measurement, threshold passing determination, or pattern detection. The data grid 104 can then perform a calculation from the second data set 130 to determine the statistic measurement 120. The data grid 104 can output the statistic measurement 120 to the client device 150 via an API response 118. The statistic measurement 120 may be displayed on a user interface of the client device.

In one example, the statistic measurement 120 may be registered by the API as a dependent object or as a dependency. A dependent object may be a variable, a data structure, a function, or a method that requires a dependency to function. As one particular example, the statistic measurement 120 may report a standard deviation of temperatures for a certain geographical region. The standard deviation of temperatures may be registered as a dependency for a weather model of the same geographical region, the weather model being a dependent object. The data grid 104 may deliver the dependency to the dependent object via the API and in response to defined criteria. For example, the data grid can send the standard deviation of temperatures to the weather model at defined time.

In some examples, the data grid 104 may compare statistic measurements from the subset of data entries 134 stored in the sliding window cache 110 to statistic measurements from the data entries 132 stored in the first data set 106. Comparing the statistic measurements from the first data set 106 to the sliding window cache 110 may be useful because the first data set 106 may include some or all of the data entries removed from the sliding window cache 110 by either expiration or eviction. The data grid 104 can output the comparison to the client device 150.

The client device 150 may additionally or alternatively provide a resource threshold 116 via the API call 114. The resource threshold 116 may be a number of statistic measurement requests, a memory usage, a central processing unit (CPU) usage, etc. related to the second data set 130. The resource threshold 116 may be useful for regulating random access memory (RAM) or other memory resources consumed by the sliding window cache 110 and the data grid 104. In response to receiving the resource threshold 116, the data grid 104 can monitor the sliding window cache 110 to determine whether the resource threshold 116 is exceeded. Upon determining that the resource threshold 116 of the second data set 130 is exceeded, the data grid 104 can output an event notification 122 via the API response 118. The API response for the event notification 122 may be a same or a different API response for the statistic measurement 120. The event notification 122 may be displayed on a user interface of the client device 150. For example, response data that includes the statistic measurement 120 can be sent to the client device 120 and cause a visual display of the statistic measurement 120 at the user interface of the client device 120. The visual display may include a gauge, a histogram, or other visual representation that includes the statistic measurement 120.

In some examples, the event notification 122 may be either a cache notification or a cache manager notification. The cache notification may be transmitted to the client device 150 and may be triggered with the addition, removal, or modification of one or more data entries within the sliding window cache 110. The cache manager notification may be triggered by the starting or stopping of the sliding window cache 110. The cache manager notification may be triggered by a node joining or leaving a cluster within the data grid 104.

Although FIG. 1 shows a certain number and arrangement of components, this is intended to be illustrative and non-limiting. Other examples may include more components, fewer components, different components, or a different arrangement of components than is shown in FIG. 1. For example, although FIG. 1 includes one client device, other examples may include multiple client devices that can each send data entries to the data grid 104. Additionally, although the example of FIG. 1 describes handling a request for storing a data entry in the data grid, other examples may relate to handling a request for removing a data entry in the data grid.

Figure 2:
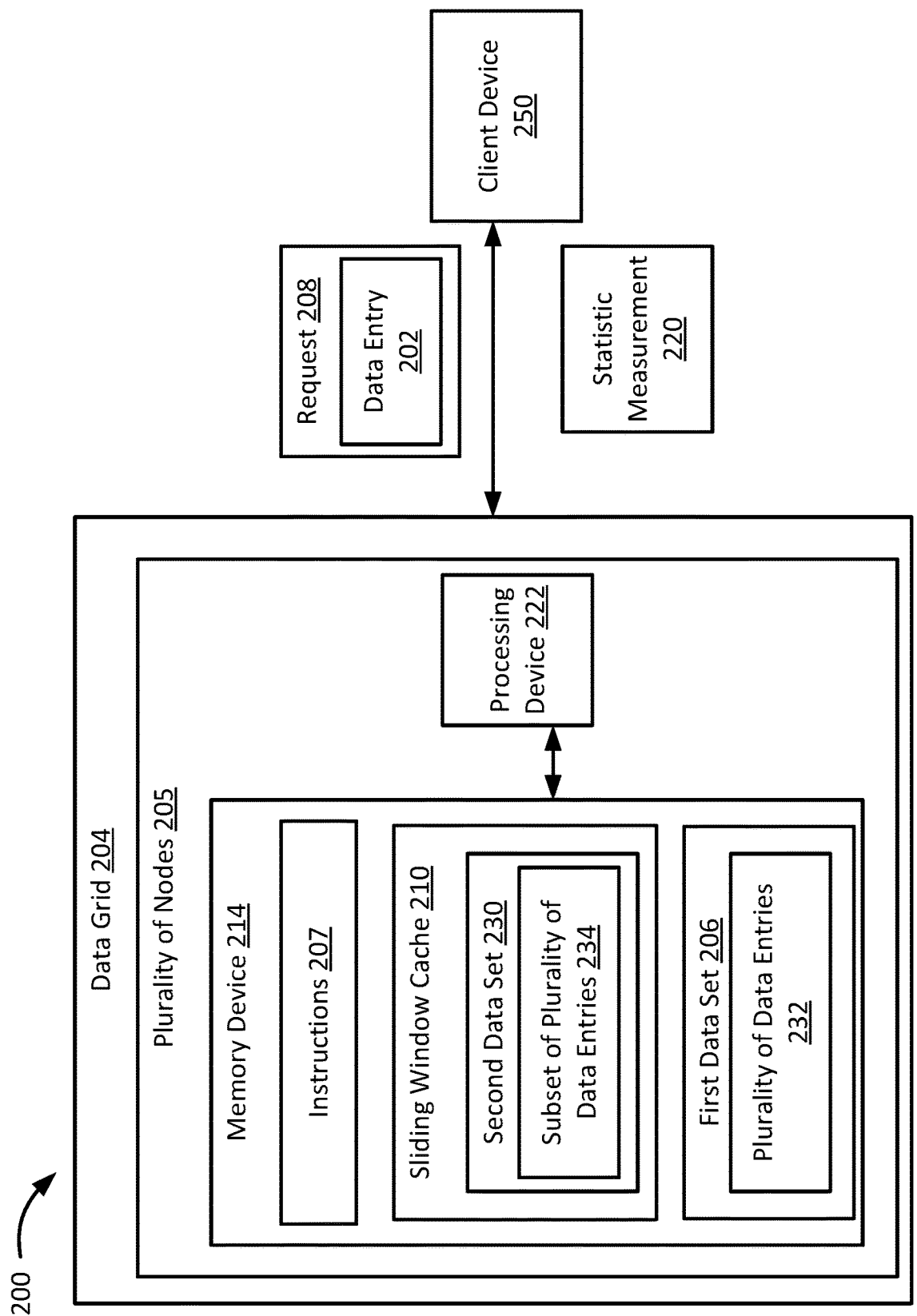
FIG. 2 is a block diagram of another example of a system for implementing data storage using a sliding window cache in a data grid according to some aspects of the present disclosure.

FIG. 2 is a block diagram of another example of a system 200 for implementing data storage using a sliding window cache in a data grid according to some aspects of the present disclosure. The system 200 includes a processing device 222 that may be communicatively coupled to a memory device 214. In some examples, the processing device 222 and the memory device 214 can be part of the same computing device. In other examples, the processing device 222 and the memory device 214 can be distributed from (e.g., remote to) one another. The system 200 can include a data grid 204 that is communicatively coupled to a client device 250.

The processing device 222 can include one processor or multiple processing devices. Non-limiting examples of the processing device 222 include a Field-Programmable Gate Array (FPGA), an application-specific integrated circuit (ASIC), a microprocessor, etc. The processing device 222 can execute instructions 207 stored in the memory device 205 to perform operations. In some examples, the instructions 207 can include processor-specific instructions generated by a compiler or an interpreter from code written in a suitable computer-programming language, such as C, C++, C#, etc.

The memory device 214 can include one memory or multiple memories. The memory device 214 can be non-volatile and may include any type of memory that retains stored information when powered off. Non-limiting examples of the memory device 214 include electrically erasable and programmable read-only memory (EEPROM), flash memory, or any other type of non-volatile memory. At least some of the memory device 214 can include a non-transitory, computer-readable medium from which the processing device 222 can read instructions 207. A computer-readable medium can include electronic, optical, magnetic, or other storage devices capable of providing the processing device 222 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 207.

In some examples, the processing device 222 can execute the instructions 207 to perform some or all of the functionality described herein. For example, the processing device 222 can receive, from the client device 250, a request 208 for storing a data entry 202. The processing device 222 can store the data entry 202 in a first data set 206 that includes a plurality of data entries 232 distributed across a plurality of nodes 205 of the data grid 204. The processing device 222 can also store the data entry 202 in a second data set 230 of a sliding window cache 210 that is embedded in the data grid 204. The second data set 230 can include a subset of the plurality of data entries 234 synchronized with the plurality of data entries 232 of the first data set 206. The second data set 230 can also be distributed across the plurality of nodes 205 of the data grid 204. The processing device 222 can determine a statistic measurement 220 associated with the second data set 230 of the sliding window cache 210. For example, the processing device 222 may receive a request for the statistic measurement 220 from the client device 250, and determine the statistic measurement 220 in response. The processing device 222 can then output the statistic measurement 220 to the client device 250.

In some examples, the processing device 222 can execute the instructions 207 to remove data entries from the sliding window cache 210 included in the second data set 230. The processing device 222 can remove data entries from the sliding window cache 210 subsequent to an expiration time associated with the data entries passing subsequent to the data entries being stored in the sliding window cache 210. Or, the processing device 222 can remove an oldest data entry from the sliding window cache 210 in response to adding a newest data entry and the sliding window cache 210 being full.

Figure 3:
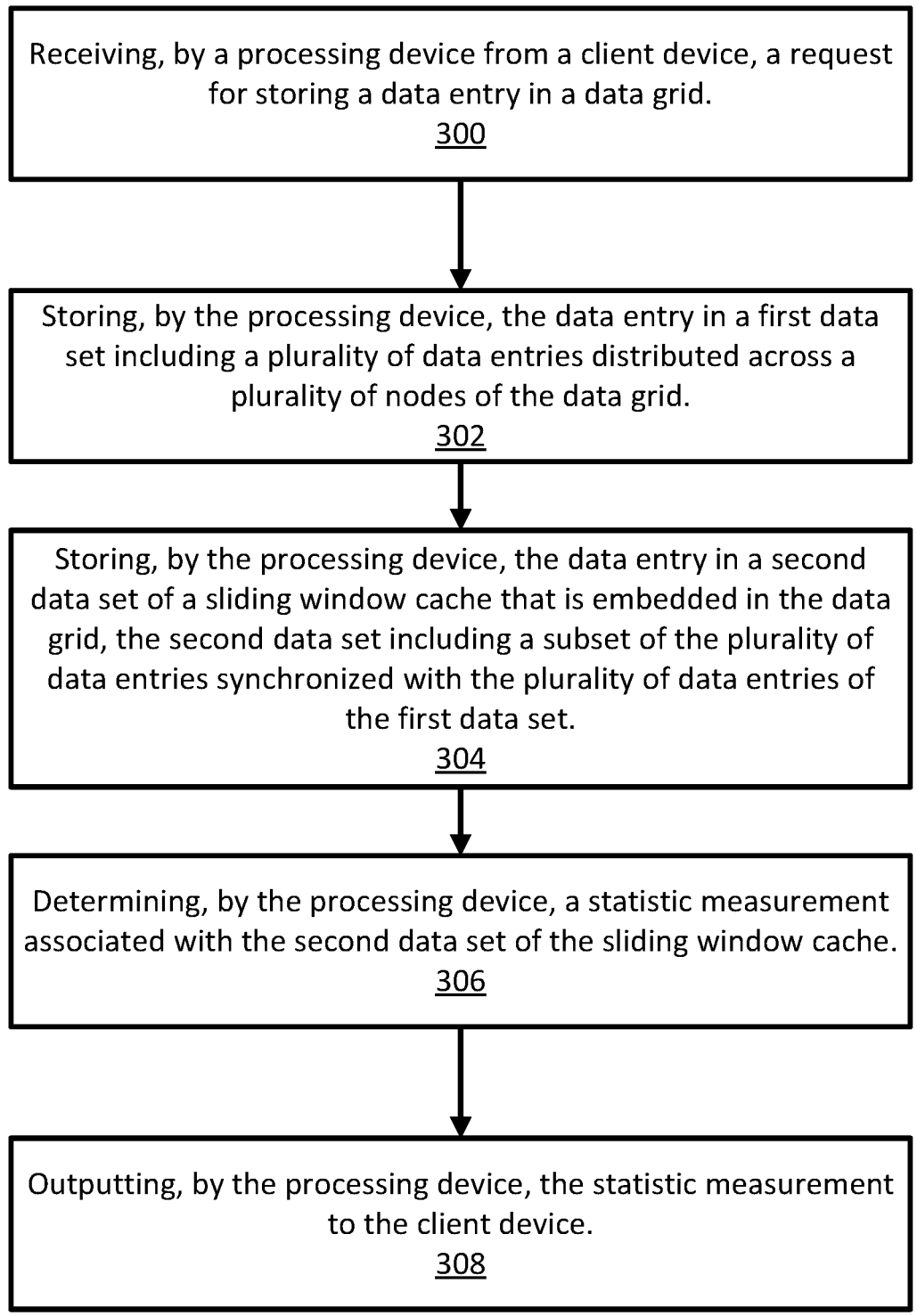
FIG. 3 is a flow chart of an example of a process for implementing data storage a sliding window cache in a data grid according to some aspects of the present disclosure.

FIG. 3 is a flow chart of an example of a process for implementing data storage a sliding window cache in a data grid according to some aspects of the present disclosure. In some examples, the processing device 222 can implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIG. 2.

In block 300 the processing device 222 may receive, from a client device 250, a request 208 for storing the data entry 202 in the data grid 204. The client device 250 may be part of a plurality of client devices, each capable of sending data entries to the data grid 204 at a high rate. The processing device 222 can receive the request 208 via an API call from the client device 250. The data grid 204 can be an in-memory data grid.

In block 302, the processing device 222 may store the data entry 202 in the first data set 206 of the data grid 204. The first data set 206 can include a plurality of data entries 232. The plurality of data entries 232 can be an entirety of data entries received by the data grid 204. The plurality of entries 232 can be distributed across a plurality of nodes 205 of the data grid 204.

In block 304, the processing device 222 may store the data entry 202 in the second data set 230 of a sliding window cache 210 that is embedded in the data grid 204. The second data set 230 may include a subset of the plurality of data entries 234 synchronized with the plurality of data entries 232 of the first data set 206. The processing device 222 may remove an oldest data entry from the sliding window cache 210, as an eviction process, in response to receiving the data entry 202. Alternatively, the processing device 222 may, in an expiration process, remove data entries from the sliding window cache 210 that have surpassed an expiration time. The expiration time may be defined within the data grid 204 or as part of the request 208. The eviction process or the expiration process may guarantee the sliding window cache 210 only includes the latest values for statistical calculations. The data grid 204 may perform statistical calculations on the data entries within the sliding window cache 210.

In block 306, the processing device 222 may determine a statistical measurement 220 associated with the second data set 230 of the sliding window cache 210. The statistical measurement 220 may be an average measurement, a standard deviation measurement, a variance measurement, a threshold passing determination, or a detected pattern. The statistical measurement 220 may be determined from the second data set 230 of the sliding window cache 210 alone, or the statistical measurement 220 may be based on the first data set 206 and the second data set 230.

In block 308, the processing device 222 may output the statistical measurement 220 to the client device 250. In some examples, the processing device 222 may output the statistical measurement 220 to a client device that did not send the data entry 202 to the data grid 204. The statistical measurement 220 may be output via an API response. In addition, the processing device can output an event notification in response to the client device 250, or another client device, exceeding a resource threshold. For example, the resource threshold can be a number of statistic measurement requests. The resource threshold may be useful for regulating RAM or other memory resources consumed by the data grid 204.

As one particular example, a data grid may be a distributed computing environment for storing information about transportation ticketing. The data grid may be oriented to handle object oriented data entries. Each data entry can correspond to a passenger and include attributes of the passenger. For example, the attributes may include price paid for ticket, days from trip ticket was purchased, travel class, etc.

The data grid can include multiple nodes, each with at least one server. For example, the data grid may include at least four servers. The servers can be in communication with a plurality of client devices. The data grid can receive a data entry that includes passenger attributes of a recently acquired transportation ticket. A locator of the data grid may direct the data entry to a first server. For example, the locator may have determined the first server possessed the most available memory or some other favorable metric to prioritize its reception of the data entry. The data grid can store the data entry in a memory device of the first server. For example, the data grid can store the data entry in a first data set in the memory device that stores all ticketing information for a plurality of passengers. The data grid can also store the data entry in a second data set of a sliding window cache of the memory device. The second data set can store the fifty most recently received data entries of ticketing information.

A client device may request, through an API associated with the data grid, a recent average ticket cost. The data grid may calculate, from the attributes of the data entries within the second data set, the average ticket price of passengers. The calculated average ticket price may be recent because the sliding window cache may either expire previous data entries that have passed a certain expiration time or evict an oldest data entry as a newest data entry enters the data grid. If the sliding window cache evicts the oldest data entry in response to receiving the newest data entry, the size of the sliding window cache can be altered to adjust the scope of statistic measurements related to the contents of the sliding window cache. The requested statistic measurement may be reliable because the data grid can ensure data consistency of the stored data entries.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example(s) described herein can be combined with any other example(s) to yield further examples.

The invention claimed is:

1. A method comprising:
   receiving, by a processing device from a client device, a request for storing a data entry in a data grid;
   storing, by the processing device, the data entry in a first data set including a plurality of data entries distributed across a plurality of nodes of the data grid;
   storing, by the processing device, the data entry in a second data set of a sliding window cache that is embedded in the data grid, the second data set including a subset of the plurality of data entries synchronized with the plurality of data entries in the first data set and having a resource threshold configured to regulate memory resources consumed by the sliding window cache;
   determining, by the processing device, a statistic measurement associated with the second data set of the sliding window cache; and
   outputting, by the processing device, the statistic measurement to the client device.

2. The method of claim 1, wherein the data entry is associated with an expiration time, and the method further comprises:
   determining the expiration time has passed subsequent to the data entry being stored in the second data set; and
   removing the data entry from the sliding window cache based on the expiration time passing.

3. The method of claim 1, wherein the sliding window cache is a fixed size and the method further comprises:
   determining that storing the data entry in the second data set exceeds the fixed size of the sliding window cache; and
   prior to storing the data entry in the second data set, removing an oldest data entry from the sliding window cache.

4. The method of claim 1, wherein the request is a first request, and the method further comprises:
   prior to determining the statistic measurement, receiving an application programming interface (API) call from the client device with a second request for the statistical measurement; and
   subsequent to determining the statistic measurement, outputting the statistic measurement to the client device via an API response.

5. The method of claim 1, further comprising:
   receiving, from the client device, the resource threshold related to the second data set;
   determining an exceeding of the resource threshold of the second data set; and
   transmitting an event notification to the client device indicating the exceeding of the resource threshold.

6. The method of claim 1, wherein the subset of the plurality of data entries of the sliding window cache comprises most recently received data entries of the first data set.

7. The method of claim 1, wherein the statistic measurement comprises a sum measurement, an average measurement, a variance measurement.

8. A system comprising:
a processing device; and
a memory device including instructions executable by the processing device for causing the processing device to:
receive, from a client device, a request for storing a data entry in a data grid;
store the data entry in a first data set including a plurality of data entries distributed across a plurality of nodes of the data grid;
store the data entry in a second data set of a sliding window cache that is embedded in the data grid, the second data set including a subset of the plurality of data entries synchronized with the plurality of data entries in the first data set and having a resource threshold configured to regulate memory resources consumed by the sliding window cache;
determine a statistic measurement associated with the second data set of the sliding window cache; and
output the statistic measurement to the client device.

9. The system of claim 8, wherein the data entry is associated with an expiration time, and the memory device further includes instructions that are executable by the processing device for causing the processing device to:
determine the expiration time has passed subsequent to the data entry being stored in the second data set; and
remove the data entry from the sliding window cache based on the expiration time passing.

10. The system of claim 8, wherein the sliding window cache is a fixed size and the memory device further includes instructions that are executable by the processing device for causing the processing device to:
determine that storing the data entry in the second data set exceeds the fixed size of the sliding window cache; and
prior to storing the data entry in the second data set, remove an oldest data entry from the sliding window cache.

11. The system of claim 8, wherein the request is a first request, and the memory device further includes instructions that are executable by the processing device for causing the processing device to:
prior to determining the statistic measurement, receive an application programming interface (API) call from the client device with a second request for the statistical measurement; and
subsequent to determining the statistic measurement, output the statistic measurement to the client device via an API response.

12. The system of claim 8, wherein the memory device further includes instructions that are executable by the processing device for causing the processing device to:
receive, from the client device, the resource threshold related to the second data set;
determine an exceeding of the resource threshold of the second data set; and
transmit an event notification to the client device indicating the exceeding of the resource threshold.

13. The system of claim 8, wherein the subset of the plurality of data entries of the sliding window cache comprises most recently received data entries of the first data set.

14. The system of claim 8, wherein the statistic measurement comprises a sum measurement, an average measurement, a variance measurement.

15. A non-transitory computer-readable medium comprising program code executable by a processing device for causing the processing device to:
receive, from a client device, a request for storing a data entry in a data grid;
store the data entry in a first data set including a plurality of data entries distributed across a plurality of nodes of the data grid;
store the data entry in a second data set of a sliding window cache that is embedded in the data grid, the second data set including a subset of the plurality of data entries synchronized with the plurality of data entries in the first data set and having a resource threshold configured to regulate memory resources consumed by the sliding window cache;
determine a statistic measurement associated with the second data set of the sliding window cache; and
output the statistic measurement to the client device.

16. The non-transitory computer-readable medium of claim 15, wherein the data entry is associated with an expiration time, and further comprising program code that is executable by the processing device for causing the processing device to:
determine the expiration time has passed subsequent to the data entry being stored in the second data set; and
remove the data entry from the sliding window cache based on the expiration time passing.

17. The non-transitory computer-readable medium of claim 15, wherein the sliding window cache is a fixed size, and further comprising program code that is executable by the processing device for causing the processing device to:
determine that storing the data entry in the second data set exceeds the fixed size of the sliding window cache; and
prior to storing the data entry in the second data set, remove an oldest data entry from the sliding window cache.

18. The non-transitory computer-readable medium of claim 15, wherein the request is a first request, and further comprising program code that is executable by the processing device for causing the processing device to:
prior to determining the statistic measurement, receive an application programming interface (API) call from the client device with a second request for the statistical measurement; and
subsequent to determining the statistic measurement, output the statistic measurement to the client device via an API response.

19. The non-transitory computer-readable medium of claim 15 further comprising program code that is executable by the processing device for causing the processing device to:
receive, from the client device, the resource threshold related to the second data set;
determine an exceeding of the resource threshold of the second data set; and
transmit an event notification to the client device indicating the exceeding of the resource threshold.

20. The non-transitory computer-readable medium of claim 15, wherein the subset of the plurality of data entries of the sliding window cache comprises most recently received data entries of the first data set.

* * * * *